US008713369B2

(12) United States Patent
Mansson et al.

(10) Patent No.: US 8,713,369 B2
(45) Date of Patent: Apr. 29, 2014

(54) HARDWARE/SOFTWARE DEBUGGING USING MEMORY ACCESS PARAMETERS

(75) Inventors: Philip Mansson, Furulund (SE); Magnus Malmberg, Sodra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 13/103,071

(22) Filed: May 8, 2011

(65) Prior Publication Data

US 2012/0284563 A1 Nov. 8, 2012

(51) Int. Cl.
*G06F 11/00* (2006.01)

(52) U.S. Cl.
USPC .......................................... 714/30

(58) Field of Classification Search
USPC ................ 714/25, 27, 30, 31, 39, 45; 702/117–122; 710/22
See application file for complete search history.

(56) References Cited

U.S. PATENT DOCUMENTS

| 6,253,292 | B1 | 6/2001 | Jhang et al. | |
|---|---|---|---|---|
| 6,889,344 | B2 * | 5/2005 | Williams | 714/43 |
| 7,305,512 | B2 * | 12/2007 | Konig et al. | 710/317 |
| 7,389,459 | B2 | 6/2008 | Blasco Allue et al. | |
| 7,437,617 | B2 | 10/2008 | Al-Omari et al. | |
| 7,743,199 | B2 | 6/2010 | Gang et al. | |
| 8,219,855 | B2 * | 7/2012 | Pedersen et al. | 714/30 |
| 2003/0056154 | A1 | 3/2003 | Edwards et al. | |
| 2006/0069953 | A1 * | 3/2006 | Lippett et al. | 714/25 |
| 2006/0259827 | A1 * | 11/2006 | Sohm et al. | 714/38 |
| 2008/0059843 | A1 | 3/2008 | Sato et al. | |
| 2010/0268990 | A1 * | 10/2010 | Xu et al. | 714/27 |
| 2010/0318746 | A1 | 12/2010 | Troxel et al. | |

FOREIGN PATENT DOCUMENTS

WO 2010/136852 A1 12/2010

OTHER PUBLICATIONS

PCT Written Opinion, mailed Jun. 14, 2012, in connection with International Application No. PCT/EP2012/057399.
PCT International Search Report, mailed Jun. 14, 2012, in connection with International Application No. PCT/EP2012/057399.
PCT International Preliminary Report on Patentability, mailed Jun. 12, 2013, in connection with International Application No. PCT/EP2012/057399 (all pages).

* cited by examiner

*Primary Examiner* — Scott Baderman
*Assistant Examiner* — Joseph Kudirka
(74) *Attorney, Agent, or Firm* — Potamac Patent Group PLLC; Kenneth B. Leffler

(57) ABSTRACT

Debug circuitry is operated in a manner that facilitates debugging one or more hardware and/or software components that are included in a system that includes a system memory. The debug circuitry receives information from one of the hardware and/or software components and/or from the system memory, and ascertains whether the received information includes memory address parameters. If the received information includes memory address parameters, then the memory address parameters are used to retrieve data from the system memory. The retrieved data is supplied at an output port of the debug circuitry.

20 Claims, 3 Drawing Sheets

HARDWARE/SOFTWARE DEBUGGING USING MEMORY ACCESS PARAMETERS

BACKGROUND

The present invention relates to debugging hardware and/or software components.

A key issue in real time computing systems is the ability to identify errors in the software and/or hardware components of the system. When the computing environment is integrated on a silicon chip, providing sufficient system observability to enable the catching of software and/or hardware errors during runtime can be very complex and costly. (Observability is a measure of to what extent the various states in a system can be ascertained, either through direct observation or by means of inference.) The result of this complexity and cost is a system with only limited observability, and hence limited ability to identify runtime errors. Even when an error is detected, it is often difficult in conventional systems to configure the system in a way that enables the capture of the root cause of the error.

The problem is even more profound when the system to be debugged/tested comprises a number of independently operating units that are able to communicate with one another and perform tasks in an interactive way, such that some parts of a task are performed by one unit, and one or more other parts of the task are performed by one or more other units.

It is therefore desirable to provide improved debugging apparatuses and methods that improve upon existing technology.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, at least some of the foregoing and other objects are achieved in methods and apparatuses for operating debug circuitry to facilitate debugging one or more hardware and/or software components that are included in a system that includes a system memory. Such operation includes the debug circuitry performing receiving information from one of the hardware and/or software components and/or from the system memory. It is then ascertained whether the received information includes memory address parameters. If the received information includes memory address parameters, then the memory address parameters are used to retrieve data from the system memory. The retrieved data is supplied at an output port of the debug circuitry.

In another aspect, operation of the debug circuitry further includes associating a time stamp with the retrieved data; and supplying the time stamp at the output port of the debug circuitry.

In another aspect, the received information is supplied at the output port of the debug circuitry.

In another aspect of some but not necessarily all embodiments, the received information and the retrieved data are multiplexed onto the output port of the debug circuitry.

In another aspect of such embodiments, supplying the received information at the output port of the debug circuitry is performed regardless of whether the received information includes memory address parameters.

In another aspect, the retrieved data is stored in a local memory of the debug circuitry, and supplying the retrieved data at the output port of the debug circuitry comprises retrieving the retrieved data from the local memory of the debug circuitry and supplying the retrieved data at the output port of the debug circuitry.

In another aspect, the received information includes an indication of whether the received information is debug-related information; and one or more of the debugging steps are performed conditionally based on whether the received information's indication indicates that the information is debug-related information.

In another aspect of some but not necessarily all embodiments, certain ones of the above-described steps can be performed conditionally based on whether one or more predetermined criteria are satisfied. For example, in some embodiments, the received information includes memory range information, and one or more of the above-described steps are performed conditionally based on whether the memory range information satisfies one or more predetermined criteria. In another example, in some embodiments, the received information includes an identifier of a source of the received information, and one or more of the above-described steps are performed conditionally based on whether the identifier of the source of the received information satisfies one or more predetermined criteria.

In another aspect, the received information includes information about what one or more of the hardware and/or software components are doing.

BRIEF DESCRIPTION OF THE DRAWINGS

The objects and advantages of the invention will be understood by reading the following detailed description in conjunction with the drawings in which.

DETAILED DESCRIPTION

Figure 1:
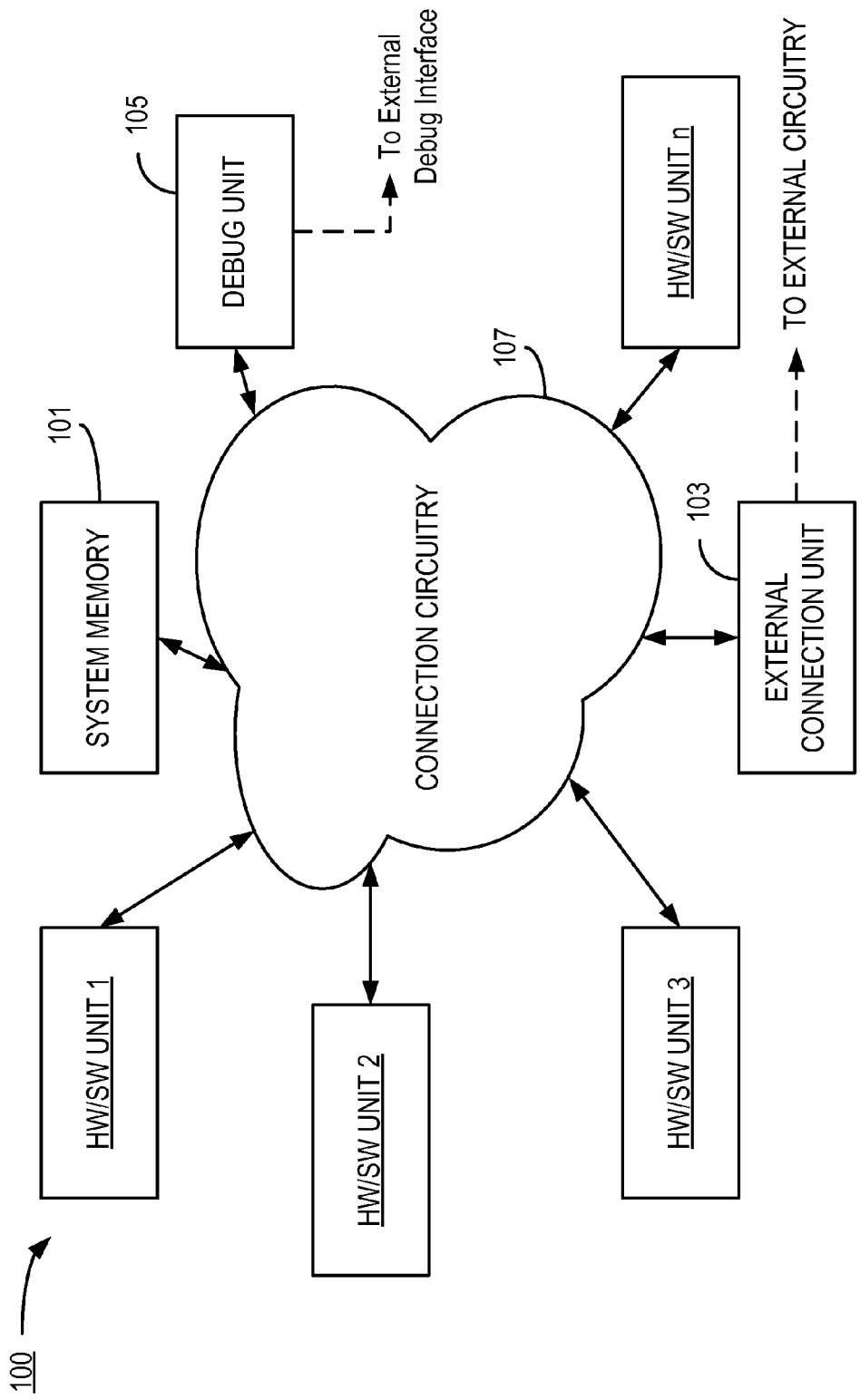
FIG. 1 is a block diagram of an exemplary system capable of providing real time computing functionality.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions and/or operating in accordance with stored configuration data. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

FIG. 1 is a block diagram of an exemplary system 100 capable of providing real time computing functionality. That is, the system 100 is capable not only of performing a defined set of functions, but doing it in a way that satisfies timing constraints imposed on the functionality.

The exemplary system includes an arbitrary number, n, of hardware/software units, denoted HW/SW Unit 1, HW/SW Unit 2, HW/SW Unit 3, . . . , HW/SW Unit n. The system 100 includes a system memory 101. Input/Output functionality to the system is provided by an external connection unit 103, which can be connected to external circuitry (not shown).

The functionality of any arbitrarily selected pair of hardware/software units selected from the hardware/software units HW/SW Unit 1, HW/SW Unit 2, HW/SW Unit 3, . . . , HW/SW Unit n may or may not be different from one another.

Debugging functionality is provided by a debugging unit 105, which is included within the system 100.

Any one of the above described elements (i.e., any one of the hardware/software units HW/SW Unit 1, HW/SW Unit 2, HW/SW Unit 3, . . . , HW/SW Unit n, the system memory 101, the external connection unit 103, and the debug unit 105) is capable of communicating with any other one of the above described elements (i.e., any one of the hardware/software units HW/SW Unit 1, HW/SW Unit 2, HW/SW Unit 3, . . . , HW/SW Unit n, the system memory 101, the external connection unit 103, and the debug unit 105) by means of connection circuitry 107. The connection circuitry 107 can be implemented by means of any bus architecture that enables any one of the units, acting as a source, to communicate with any other one of the units, acting as a destination. Just for the sake of example, and without limitation, suitable bus topologies include a bus network architecture, a ring network, and a star network.

The debug unit 105 monitors activities taking place within the system 100 by, in one respect, receiving information from one or more of the other units within the system 100, and making information available to the external debug tools via the external debug interface.

In an aspect of embodiments consistent with the invention, the debug unit 105 enhances the observability of the system 100 by using the received information to ascertain a portion of the system memory 101 that contains data of interest, retrieving the data of interest, and supplying the data of interest to the external debug tools via the external debug interface.

Figure 2:
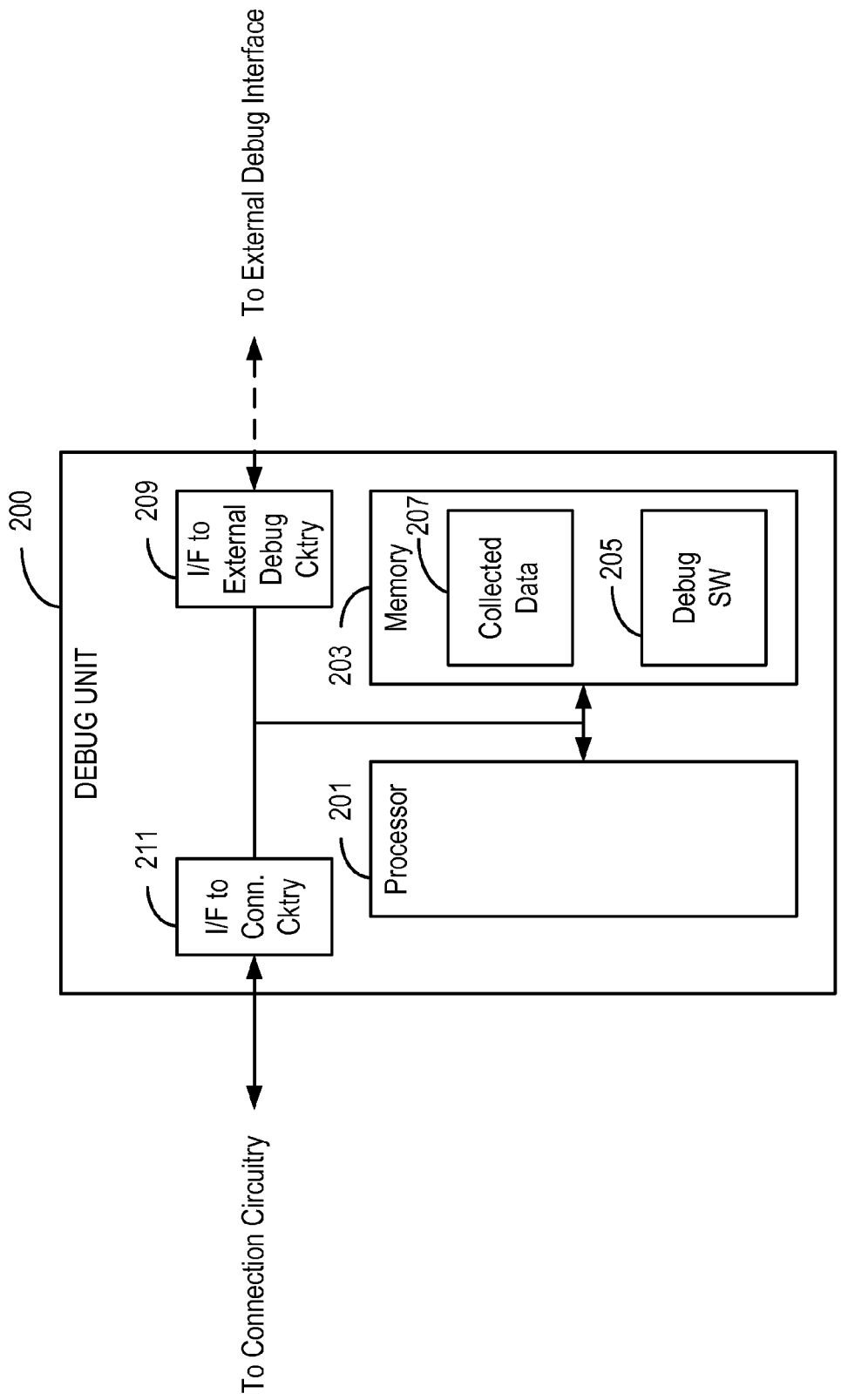
FIG. 2 is a block diagram of an exemplary debug unit having elements consistent with one or more aspects of the invention.

FIG. 2 is a block diagram of an exemplary debug unit 200 having elements consistent with one or more aspects of the invention. The exemplary debug unit 200 includes a programmable processor 201 that is bidirectionally coupled to a memory unit 203. The memory unit 203 includes a set of program instructions ("debug SW") 205 that, when executed by the processor 201, cause the processor 203 to carry out the functions specified by the program instructions 205. In this example, the memory 203 also includes space for storing other data 207 collected or otherwise generated by the processor 201. In other embodiments, this data might be stored in a separate unit. In other alternatives, it might not be stored at all, but is instead supplied directly to an interface ("I/F") to external debug circuitry 209 as soon as it is made available to the debug unit 200.

The interface to external debug circuitry 209 is bidirectionally coupled to the processor 201 so that instructions and other debugging parameters can be received from external equipment (not shown), and so that collected/generated debug information can be supplied to that equipment.

As mentioned earlier, the debug unit 200 is capable of communicating with other system units by means of the connection circuitry 107. Accordingly, the debug unit 200 further includes an interface to the connection circuitry 211. The interface to the connection circuitry 211 has a bidirectionally coupled to the processor 201.

The debug unit 200 is configured to operate in accordance with the functions described above and as will be described further in connection with FIG. 3. It will be appreciated that, in order to facilitate the description, the exemplary debug unit 200 is implemented by means of programmable circuitry. Notwithstanding this, other embodiments are also within the scope of the invention, such as completely hardwired embodiments, so long as they carry out the functionality described herein.

Figure 3:
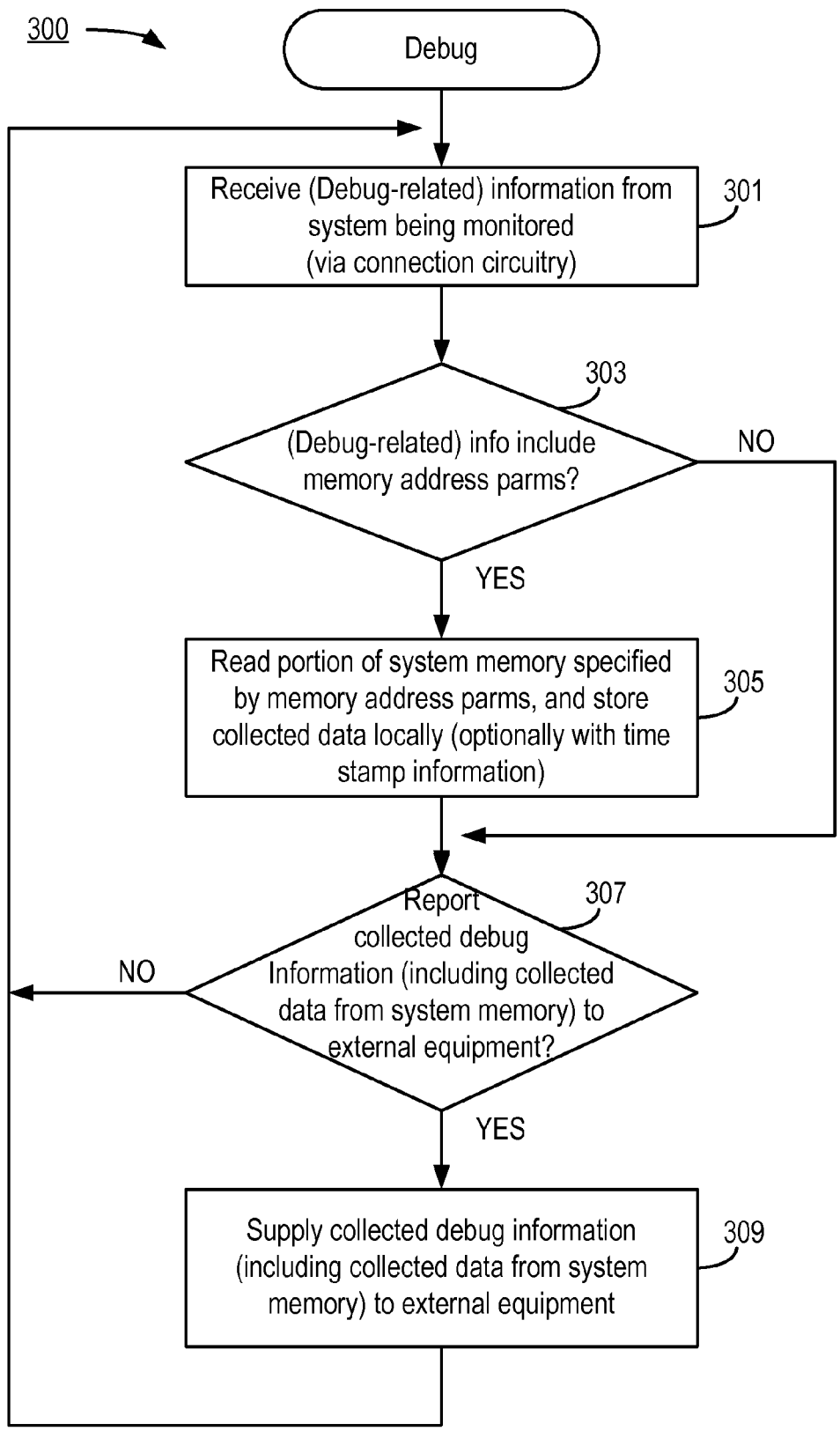
FIG. 3 is, in one respect, a flow diagram of steps/processes performed in accordance with some embodiments of the invention.

FIG. 3 is, in one respect, a flow diagram of steps/processes performed in accordance with some embodiments of the invention. FIG. 3 is, in another respect, a block diagram of circuitry 300, configured to carry out debugging functions in a system, such as but not limited to that depicted in FIG. 1.

The debug circuitry 300 receives information from one of the hardware and/or software components, such as those depicted in FIG. 1 (step 301). The information can, for example, represent messages that have been sent from one of the units HW/SW Unit 1, HW/SW Unit 2, HW/SW Unit 3, . . . , HW/SW Unit n, the external connection unit 103 to another one of the units HW/SW Unit 1, HW/SW Unit 2, HW/SW Unit 3, . . . , HW/SW Unit n, the external connection unit 103. In this way, the debug unit 300 can "sniff" activity that is taking place within the system 100 and thereby collect debug information to be reported to external debug equipment. That is, the received information can indicate what one or more of the hardware and/or software components are doing.

In an aspect of some but not necessarily all embodiments, any one or more of the units HW/SW Unit 1, HW/SW Unit 2, HW/SW Unit 3, . . . , HW/SW Unit n, are adapted to send at least some debug information (indicating what one or more of the hardware and/or software components are doing) to the system memory 101, and the system memory 101 (or logic circuitry associated with the system memory) is configured to forward the debug information to the debug unit 300. This can be an exclusive source of debug information for the debug unit 300, or can be in addition to the debug unit's "sniffing" activity described above.

The debug information received by the debug circuitry 300 can, but may not necessarily, include memory address parameters (e.g., a start address and length), to identify the location of data that has been stored by one of the units HW/SW Unit 1, HW/SW Unit 2, HW/SW Unit 3, . . . , HW/SW Unit n, the external connection unit 103 into the system memory 101. Because of this possibility, the debug unit 300 ascertains whether the received information includes memory address parameters (decision block 303).

If the received information includes memory address parameters ("YES" path out of decision block 303), then the debug unit 300 uses those memory parameters to retrieve data from the system memory 101 (step 305).

At some point, it is determined whether the collected debug information should be reported to external equipment (decision block 307) and if so ("YES" path out of decision block 307), the collected information (including any collected data from system memory 101) is reported to external equipment by supplying it to an output port of the debug circuitry 300 (step 309). In some but not necessarily all embodiments, the collected debug information and collected data from system memory 101 are reported to external equipment by multiplexing them onto a same output port of the debug circuitry 300. Determining whether the collected debug information should be reported to external equipment can, for example, involve having an indication (e.g., "debug flag/bit") of whether the received information is debug-related information, and collecting and/or reporting debug information to external equipment conditionally, based on the state of the indication (e.g., collection and/or reporting of the debug information is performed only if the debug flag/bit indicates that information being "sniffed" is debug-related information).

In some but not necessarily all embodiments, determining whether the collected debug information should be reported to external equipment (decision block 307) involves (by itself or in addition to the indication (e.g., "debug flag/bit") described above), basing a decision on whether received memory range information satisfies one or more predetermined criteria, and or whether an identifier of the source of the collected debug information satisfies one or more predetermined criteria.

If no memory address parameters were included in the received information ("NO" path out of decision block 303), then there is no need to access the system memory 101, and processing proceeds directly to decision block 307.

Various embodiments, can differ from the embodiment shown in FIG. 3. For example, in some embodiments a time stamp is associated with the retrieved data. The time stamp is supplied along with the retrieved data at the output port of the debug circuitry. Having time stamp information can facilitate debugging activities.

In some embodiments, debug information that has been collected (e.g., the received information in general and/or the collected data from system memory 101) is supplied to external equipment as soon as it is available in the debug unit 300. In alternative embodiments, the collected data (including retrieved data from system memory 101) is not reported immediately to external equipment, but is instead stored in a local memory of the debug unit 300, such as the memory 203 shown in FIG. 2 (see, e.g., collected data 207). In such embodiments, supplying the retrieved data at the output port of the debug circuitry comprises retrieving the retrieved data from the local memory of the debug circuitry and supplying the retrieved data at the output port of the debug circuitry.

The various embodiments consistent with the invention provide enhanced debugging capabilities. Advantageous characteristics include easy configurability, and the ability to trace the contents of a shared memory at a specific point in time, even if the system is asynchronously driven.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating debug circuitry to facilitate debugging one or more hardware and/or software components that are included in a system that includes a system memory, the method comprising:

the debug circuitry:
receiving information from one of the hardware and/or software components and/or from the system memory;
ascertaining whether the received information includes memory address parameters;
if the received information includes memory address parameters, then using the memory address parameters to locate and retrieve data from the system memory; and
supplying the retrieved data at an output port of the debug circuitry, wherein:
the received information includes an indication of whether the received information is debug-related information; and
one or more of the method steps are conditionally performed or not performed based on whether the received information's indication indicates that the received information is debug-related information.

2. The method of claim 1, comprising:
associating a time stamp with the retrieved data; and
supplying the time stamp at the output port of the debug circuitry.

3. The method of claim 1, comprising:
supplying the received information at the output port of the debug circuitry.

4. The method of claim 3, wherein the received information and the retrieved data are multiplexed onto the output port of the debug circuitry.

5. The method of claim 3, wherein supplying the received information at the output port of the debug circuitry is performed regardless of whether the received information includes memory address parameters.

6. The method of claim 1, comprising:
storing the retrieved data in a local memory of the debug circuitry,
wherein supplying the retrieved data at the output port of the debug circuitry comprises retrieving the retrieved data from the local memory of the debug circuitry and supplying the retrieved data at the output port of the debug circuitry.

7. The method of claim 1, wherein one or more of the steps of claim 1 are conditionally performed or not performed based on whether one or more predetermined criteria are satisfied.

8. The method of claim 1, wherein:
the received information includes memory range information; and
one or more of the steps of claim 1 are conditionally performed as or not performed based on whether the memory range information satisfies one or more predetermined criteria.

9. The method of claim 1, wherein:
the received information includes an identifier of a source of the received information; and
one or more of the steps of claim 1 are conditionally performed or not performed based on whether the identifier of the source of the received information satisfies one or more predetermined criteria.

10. The method of claim 1, wherein the received information includes information about what one or more of the hardware and/or software components are doing.

11. An apparatus for facilitating debugging one or more hardware and/or software components that are included in a system that includes a system memory, the apparatus comprising:

circuitry configured to receive information from one of the hardware and/or software components and/or from the system memory;

circuitry configured to ascertain whether the received information includes memory address parameters;

circuitry configured to respond to the received information including memory address parameters by using the memory address parameters to locate and retrieve data from the system memory; and circuitry configured to supply the retrieved data at an output port of the apparatus, wherein:

the received information includes an indication of whether the received information is debug-related information; and one or more components of the apparatus are configured to conditionally operate or not operate based on whether the received information's indication indicates that the received information is debug-related information.

12. The apparatus of claim 11, comprising:

circuitry configured to associate a time stamp with the retrieved data; and circuitry configured to supply the time stamp at the output port of the apparatus.

13. The apparatus of claim 11, comprising:

circuitry configured to supply the received information at the output port of the apparatus.

14. The apparatus of claim 13, wherein the received information and the retrieved data are multiplexed onto the output port of the apparatus.

15. The apparatus of claim 13, wherein the circuitry configured to supply the received information at the output port of the apparatus is operational regardless of whether the received information includes memory address parameters.

16. The apparatus of claim 11, comprising:

circuitry configured to store the retrieved data in a local memory of the apparatus, wherein the circuitry configured to supply the retrieved data at the output port of the apparatus comprises circuitry configured to retrieve the retrieved data from the local memory of the apparatus and to supply the retrieved data at the output port of the apparatus.

17. The apparatus of claim 11, wherein one or more components of the apparatus are configured to conditionally operate or not operate based on whether one or more predetermined criteria are satisfied.

18. The apparatus of claim 11, wherein:

the received information includes memory range information; and one or more components of the apparatus are configured to conditionally operate or not operate based on whether the memory range information satisfies one or more predetermined criteria.

19. The apparatus of claim 11, wherein:

the received information includes an identifier of a source of the received information; and one or more components of the apparatus are configured to conditionally operate or not operate based on whether the identifier of the source of the received information satisfies one or more predetermined criteria.

20. The apparatus of claim 11, wherein the received information includes information about what one or more of the hardware and/or software components are doing.

* * * * *

UNITED STATES PATENT AND TRADEMARK OFFICE
CERTIFICATE OF CORRECTION

| | | |
|---|---|---|
| PATENT NO. | : 8,713,369 B2 | Page 1 of 1 |
| APPLICATION NO. | : 13/103071 | |
| DATED | : April 29, 2014 | |
| INVENTOR(S) | : Månsson et al. | |

It is certified that error appears in the above-identified patent and that said Letters Patent is hereby corrected as shown below:

On The Title Page,

In Item (75), under "Inventors", in Column 1, Line 1, delete "Mansson," and insert -- Månsson, --, therefor.

In Item (75), under "Inventors", in Column 1, Line 2, delete "sodra" and insert -- Södra --, therefor.

In Item (75), under "Inventors", in Column 2, Line 1, delete "Potamac" and insert -- Potomac --, therefor.

In The Specification,

In Column 3, Line 59, delete "processor 203" and insert -- processor 201 --, therefor.

Signed and Sealed this
Twelfth Day of May, 2015

Michelle K. Lee
*Director of the United States Patent and Trademark Office*